(12) United States Patent
Will

(10) Patent No.: US 12,186,965 B2
(45) Date of Patent: Jan. 7, 2025

(54) METHOD FOR PRODUCT GUIDANCE IN A STRETCH BLOW MOLDING AND/OR FILLING SYSTEM, AND STRETCH BLOW MOLDING AND/OR FILLING SYSTEM FOR BOTTLES

(71) Applicant: KRONES AG, Neutraubling (DE)

(72) Inventor: Christof Will, Obertraubling (DE)

(73) Assignee: KRONES AG, Neutraubling (DE)

( * ) Notice: Subject to any disclaimer, the term of this patent is extended or adjusted under 35 U.S.C. 154(b) by 127 days.

(21) Appl. No.: 17/593,028

(22) PCT Filed: Feb. 10, 2020

(86) PCT No.: PCT/EP2020/053297
§ 371 (c)(1),
(2) Date: Sep. 3, 2021

(87) PCT Pub. No.: WO2020/177982
PCT Pub. Date: Sep. 10, 2020

(65) Prior Publication Data
US 2022/0203597 A1    Jun. 30, 2022

(30) Foreign Application Priority Data

Mar. 6, 2019 (DE) .......................... 102019203062.9

(51) Int. Cl.
*B29C 49/78* (2006.01)
*B29C 49/12* (2006.01)
*B29L 31/00* (2006.01)

(52) U.S. Cl.
CPC ............ *B29C 49/786* (2013.01); *B29C 49/12* (2013.01); *B29C 49/78* (2013.01); *B29L 2031/7158* (2013.01)

(58) Field of Classification Search
CPC ....... B29C 49/786; B29C 49/12; B29C 49/78; B29L 2031/7158; G06F 11/34
See application file for complete search history.

(56) References Cited

U.S. PATENT DOCUMENTS

| 2006/0149407 A1 | 7/2006 | Markham et al. |
| 2008/0211125 A1 | 9/2008 | Derrien et al. |

(Continued)

FOREIGN PATENT DOCUMENTS

| DE | 10259589 B3 | 4/2004 |
| DE | 102005060814 A1 | 7/2007 |

(Continued)

OTHER PUBLICATIONS

ISA European Patent Office, International Search Report Issued in Application No. PCT/EP2020/053297, Apr. 29, 2020, WIPO, 4 pages.

*Primary Examiner* — Christopher M Rodd
*Assistant Examiner* — Shibin Liang
(74) *Attorney, Agent, or Firm* — McCoy Russell LLP

(57) ABSTRACT

A method for product guidance in a stretch blow molding and/or filling system for bottles, and a corresponding production system are described. Preform parameters of preforms provided for stretch blow molding are measured in an automated manner and initial data acquired in the process is stored. Bottle parameters of the blown empty bottles and/or subsequently filled bottles are measured and machine error states are optionally detected. Results data acquired in the process are individually associated with the preforms and stored. At least one lead-out criterion applicable in the downstream production operation is calculated for deciding whether or not to lead out faulty preforms or bottles, based on the initial data and results data. The lead-out criterion is (Continued)

additionally updated in an automated manner while taking into consideration the acquired initial data and results data.

20 Claims, 1 Drawing Sheet

(56) References Cited

U.S. PATENT DOCUMENTS

| | | | |
|---|---|---|---|
| 2009/0108505 A1 | 4/2009 | Steiner | |
| 2013/0214460 A1* | 8/2013 | Rogers | B29C 49/0005 264/537 |
| 2014/0298100 A1* | 10/2014 | Grimm | G06F 11/3409 714/37 |
| 2015/0037518 A1* | 2/2015 | Haner | B29C 49/80 428/29 |
| 2017/0315540 A1 | 11/2017 | Nishioka | |

FOREIGN PATENT DOCUMENTS

| | | |
|---|---|---|
| DE | 102011017448 A1 | 10/2012 |
| DE | 102012022474 A1 | 5/2014 |
| DE | 102017120201 A1 | 3/2019 |

\* cited by examiner

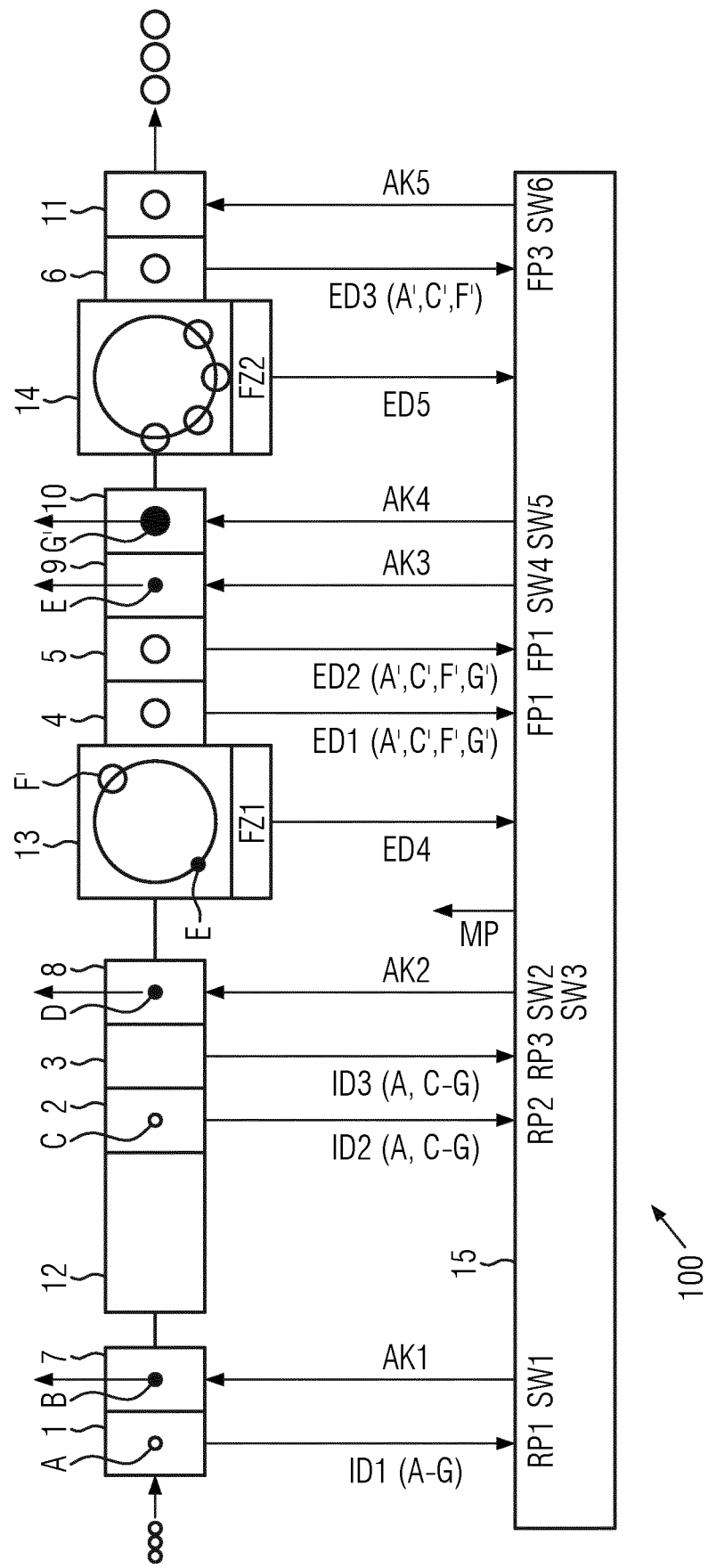

METHOD FOR PRODUCT GUIDANCE IN A STRETCH BLOW MOLDING AND/OR FILLING SYSTEM, AND STRETCH BLOW MOLDING AND/OR FILLING SYSTEM FOR BOTTLES

CROSS REFERENCE TO RELATED APPLICATIONS

The present application is a U.S. National Phase of International Application No. PCT/EP2020/053297 entitled "METHOD FOR PRODUCT CONTROL IN A STRETCH BLOW MOULDING AND/OR FILLING INSTALLATION, AND STRETCH BLOW MOULDING AND/OR FILLING INSTALLATION FOR BOTTLES," and filed on Feb. 10, 2020. International Application No. PCT/EP2020/053297 claims priority to German Patent Application No. 10 2019 203 062.9 filed on Mar. 6, 2019. The entire contents of each of the above-listed applications are hereby incorporated by reference for all purposes.

TECHNICAL FIELD

The disclosure relates to a method for product guidance in a stretch blow molding system and/or filling system and to a stretch blow molding system and/or filling system for bottles.

BACKGROUND

As is known, plastic blanks, also referred to as preforms, can be formed by stretch blow molding to form bottles. For this purpose, the preforms are preheated immediately prior to stretch blow molding and inspected in an automated manner with regard to various parameters relevant for stretch blow molding, such as, for example, for impermissible deformation, damage, and/or fouling.

SUMMARY

For example, quality control of preforms both upstream and downstream of a heating station is known from DE 102 59 589 B3. On the basis of a first inspection, the preforms are then classified, for example, with regard to the extent of possible defects. A decision is then made as to whether certain faulty preforms are to be led out already upstream of the heating station or only thereafter. In any case, it can be prevented that faulty preforms are fed to a downstream stretch blow molding machine.

It is further known from DE 10 2005 060 814 A1 to pass faulty preforms through a stretch blow molding machine possibly without a blow molding process, and to lead them out only thereafter. It is also described that, depending on the extent of the defect in the individual preforms, an incomplete stretch blow molding process can be carried out, such as by stretching faulty preforms. By inspecting the properly blown bottles and the preforms possibly only stretched, additional information can be obtained, for example, whether and/or how certain defective properties and/or states of the preforms correlate with the outcome of the stretch blow molding process.

However, it has proven to be difficult and time-consuming to evaluate the data thus collected such that always only those preforms are removed from the product flow which are highly likely to lead to a faulty bottle and/or a machine error state in the region of the stretch blow molding machine and/or a downstream filling machine. For example, it may be desirable to be able to correlate as many properties and/or states of the preforms as possible with such results data in order to optimize the quality of the manufacture and filling process of the bottles for the ongoing production process and to minimize downtimes and/or production gaps in the production flow.

A method for preventing malfunction in a bottle treatment system in which reference parameters and test parameters are established for individual system components is known from DE 10 2011 017 448 A1. It is then intended to optimize relationships between the causes of errors and error states using computer-aided artificial intelligence, for example, with a neural network. In this context, automated or semi-automated teaching processes for the treatment system are also known in principle.

However, it may be desirable not only to prevent error states in such systems, but also to optimize the product quality and the machine performance as a whole.

According to the present disclosure, a method may be used for product guidance in a stretch blow molding system and/or filling system for bottles or for production control of the system. In the method, preform parameters of preforms made available for stretch blow molding, for instance, such made of PET, can be measured in an automated manner and the initial data thus obtained is stored. Furthermore, bottle parameters of stretch-blow-molded empty and/or subsequently filled bottles can be measured in an automated manner and machine error states that occur during the stretch blow molding and/or filling process are also determined in an automated manner. Results data acquired in the process is individually associated with the preforms and stored. Furthermore, at least one lead-out criterion applicable in the downstream production operation is calculated for deciding whether or not to lead out faulty preforms or empty bottles based on a data analysis of the initial data and results data stored. The calculation of said lead-out criterion can be updated in an automated manner taking into consideration initial data and results data acquired during production.

Lead-out criteria can consequently be calculated more and more precisely with increasing production time for leading the preforms or empty bottles out as selectively as possible, for example, at a suitable point in the production process, in order to, firstly, obtain as much results data as possible for optimizing the production process, secondly, to prevent machine error states as reliably as possible. This also minimizes interruptions in production.

For example, a machine learning process that progresses with the production operation is possible which runs in an automated manner on the basis of calculation rules and can furthermore optionally be controlled by operators.

The initial data and the results data acquired can be incorporated into the production operation by way of manual and/or automated updating.

Machine parameters, for example, of a heating station for preheating the preforms, a stretch blow molding machine for producing the bottles, and/or a filling machine for filling the bottles, can be adapted on the basis of the initial data and the results data acquired to optimize the product quality.

This is used for ongoing quality assurance and/or quality improvement of manufactured/filled bottles. Above all, this allows the scrap rate of the production to be reduced.

When determining lead-out criteria, priority may be given to optimizing the quality of production over the most comprehensive possible collection of initial data and/or results data. This means that a preform that is unsuitable for further processing is led out from the product flow as early as possible in the weighting case, as is necessary or can be predicted in order to achieve a certain product quality.

The lead-out criterion can be changed in an automated manner in such a way that a proportionate frequency of permissible values of the bottle parameters predicted by way of the data analysis increases and, optionally, a predicted proportionate frequency of the machine error states also decreases. This enables a continually self-improving optimization process. The product quality of the stretch-blown and/or filled bottles can thus be improved while at the same time minimizing production downtimes and/or product gaps in the product flow. The proportional frequency is understood to be, for example, the number of correctly manufactured and closed bottles per number of preforms examined, e.g., on the assumption that the average quality of the preforms provided remains constant.

The data analysis can comprise data mining, such as an association analysis and/or a regression analysis, and/or a data classification of the initial data and/or the results data. Classification, regression analysis, and association analysis can be suitable for evaluating newly acquired initial data and results data in the context of a prognosis about the effect of certain preform parameters on bottle parameters to be achieved.

Such analysis methods can be used in the context of machine learning processes and self-optimization of the blow molding machine and/or the filling system in the sense of artificial intelligence or the like. Furthermore, additional, possibly previously unknown or undervalued correlations between individual preform parameters and/or bottle parameters can be established and/or included in the data analysis.

In certain embodiments, fulfilling the lead-out criterion based on the initial data of a specific preform triggers one of the following steps: leading the preform out upstream of the blow mold provided for stretch blow molding; passing the preform through in the intended blow mold without stretch blow molding it and subsequently leading the preform out; or stretch blow molding the preform and leading out the bottle produced in the process, such as prior to the filling process.

In certain embodiments, the preforms are then led out all the more further upstream, the greater the extent of an ascertained deviation of initial data from associated target values. On the one hand, machine error states can be prevented reliably, but on the other hand, certain preforms may also still go through as many inspection steps and/or production steps as possible in order to use the initial data and results data acquired for the data analysis. Such preforms from which no proper product can be manufactured are then also used for optimization and the automated self-learning process, for example, by verifying or establishing certain correlations of preform parameters and bottle parameters in an automated manner.

Target ranges can be defined for the preform parameters on the basis of the data analysis, where lead-out criteria are then fulfilled, for example, where the initial data of a preform examined deviates from the respective target ranges, deviates to a certain extent, and/or deviates for a certain combination of preform parameters. This enables comparatively simple control and association of individual lead-out processes at certain points in the production flow, for example, by way of lead-out criteria that respectively apply there, both for the examined preforms and, possibly, also for stretch-blow-molded bottles possibly produced therefrom.

In some embodiments, the target ranges and/or the lead-out criterion are updated in an automated manner on the basis of a progressive accumulation of initial data and results data. The data analysis can thus be refined and rendered more precise as the production progresses. It is also possible to ignore or delete certain data records of initial data and results data, for example, outdated data records or those that relate to sets of parameters with preform parameters and/or results parameters that cannot be used for certain preforms.

Several sets of parameters can be taken into consideration in the data analysis, each of which comprises associated preform parameters and bottle parameters, Deviations of the measured preform parameters from their target ranges are there included with a suitable weighting in defining the lead-out criteria. In some embodiments, the deviations are then weighted dynamically on the basis of the initial data and the results data acquired.

For example, preform parameters for which deviations from their associated target ranges have turned out to be less critical in the course of the data analysis progressing during the production operation can be weighted less and vice versa.

The preform parameters may indicate multiple, e.g., at least three or five, of the following properties and/or states of the respective preform: its length and/or contour; its color; ovality of its sealing surface, fouling of its sealing surface; damage to its sealing surface; location of its injection point; a temperature profile in a wall of the preform; material stress in a wall of the preform; its material; air pockets, streaks, and/or cracks; and a wall thickness of the preform.

At least some of the preform parameters may be recorded by imaging upstream of an inlet region to a stretch blow molding carousel, such as upstream, in and/or immediately downstream of a heating tunnel for preheating the preforms. Comprehensively and flexibly evaluateable initial data is acquired by imaging from comparatively few measurement processes with the data analysis and is also determined as far upstream of the stretch blow molding carousel as possible in order to be able to carry out any lead-out processes and any bottle inspections in a selective and timely manner that may need to be performed.

The bottle parameters may indicate at least two of the following properties and/or states of the bottles: the position of the injection point; fouling of the base; cloudiness of the base; contour of the side wall; fouling of the side wall; cloudiness of the sidewall; ovality of the sealing surface; fouling of the sealing surface; damage to the sealing surface; distribution of material in the base; symmetry/asymmetry of the mass distribution; and bottle fracture.

In some embodiments, the error states comprise: a preform jamming in a blow mold; a blow mold loaded multiple times, a leak during the blow molding process, the preform tearing off during stretching or pre-blowing; and/or a leak or burst during the filling process; and/or falling over on the onward transportation due to a deformed container geometry.

The object posed may be likewise satisfied by a stretch blow molding system and/or filling system for bottles according to the present disclosure. According thereto, the stretch blow molding system and/or filling system comprises a stretch blow molding machine and/or a filling machine for bottles and in addition: at least one lead-out device for preforms arranged upstream and/or downstream of the stretch blow molding machine; a lead-out device for previously blown bottles arranged downstream of the stretch blow molding machine; inspection units for the preforms and the bottles for collecting initial data and results data with the method according to at least one of the preceding embodiments; and a control device for triggering the lead-out devices on the basis of at least one lead-out criterion calculated using the method according to at least one of the embodiments described above.

BRIEF DESCRIPTION OF THE FIGURES

An embodiment of the disclosure is illustrated by drawing. FIG. 1. shows a schematic top view onto a production system with associated data streams.

DETAILED DESCRIPTION

As is evident from FIG. 1, the method according to the disclosure for production control can be carried out in a stretch blow molding and filling system 100 for bottles. Stretch blow molding and filling system 100 accordingly comprises inspection units 1-3 for preforms, inspection units 4-6 for bottles, lead-out devices 7-9 for preforms, lead-out devices 10, 11 for bottles, a heating station 12, such as a heating tunnel, for preheating the preforms provided for stretch blow molding, a stretch blow molding machine 13 with a plurality of blow molds (not shown) for stretch blow molding of bottles from the preheated preforms, a filling machine 14 for filling a liquid product, such as a beverage, into the stretch-blow-molded bottles, and a controller 15 for the stretch blow molding and filling system 100, each illustrated by way of example.

The production control device is indicated schematically by way of example with the aid of seven preforms A-G supplied/provided and/or bottles A', C', F' and G' stretch-blow-molded therefrom. Black circle fillings there indicate negative inspection results. Accordingly, due to negative inspection results upstream in at least one of inspection units 1-3 arranged upstream of stretch blow molding machine 13 and on the inlet side thereof, two preforms B, D are led out at first and/or second lead-out device 7, 8 upstream of stretch blow molding machine 13.

In contrast, despite at least one negative inspection result in inspection units 1-3 on the inlet side, preform E is first passed through stretch blow molding machine 13 and led out only at third lead-out device 9 arranged downstream of stretch blow molding machine 13 and on the inlet side thereof.

Four preforms A, C, F and G (not all of which are illustrated as a small circle) pass first and second inspection units 2, 3 with proper inspection results and are consequently stretch-blown to form bottles A', C', F', and G'.

In first inspection unit 1 on the inlet side, a first preform parameter RP1 is measured upstream of heating station 12, for example, the extent of a sealing surface asymmetry of preforms A-G. In second and third inspection unit 2, 3 on the inlet side, a second and third preform parameter RP2, RP3 are measured in and/or downstream of heating station 12, for example, a temperature profile created in preforms A and C-G and the extent of any possibly existing sidewall fouling of preforms A and C-G.

First inspection unit 2 delivers at least one measured value of first preform parameter RP1 in the form of first initial data ID1 for each preform A-G measured there. Second inspection units 3 correspondingly delivers measured values of second and third preform parameters RP2, RP3 in the form of second and third initial data ID2, ID3 for each preform A, C-G measured there. They are each transmitted to control device 15. First initial data ID1 is associated with all preforms A-G, second and third initial data ID2, ID3 with remaining empty preforms A and C-G.

In fourth and fifth inspection units 4, 5 arranged downstream of stretch blow molding machine 13 and on the outlet side thereof, stretch-blow-molded bottles A', C', F', G' (not all of which are illustrated as a large circle) are examined with regard to bottle parameters FP1, FP2 created such as, for example, distribution of material in the base of bottles A', C', F', G' and damage to their sealing surfaces. Fourth inspection unit 4 there delivers at least one measured value of first bottle parameter FP1 in the form of first results data ED1 for each bottle measured there, fifth inspection unit 5 correspondingly delivers at least one measured value of second bottle parameter FP2 in the form of second results data ED2. They are each transmitted to control device 15. First and second results data ED1, ED2 are associated with preforms A, C, F, G blown to form bottles A', C', F', G' and therefore with their initial data ID1-ID2.

Preform E could optionally be processed incompletely when passed through stretch blow molding machine 13, for example, only by stretching without final blow molding to form a bottle, and be inspected in fourth and/or fifth inspection unit 4, 5 with regard to at least one of bottle parameters FP1, FP2 or with regard to a parameter, for example, that is relevant only for the stretching process or a similar treatment step. Results data ED2 acquired there can then likewise be stored in control device 15 and associated with preform E as well as its already stored initial data ID1-ID3.

In sixth inspection unit 6 on the outlet side with regard to stretch blow molding and filling, stretch-blow-molded and filled bottles A', C', F' are measured with regard to at least one bottle parameter FP3, for example, for leaks or the like, generated during the stretch blow molding and/or filling process. Result data ED3 acquired there can then likewise be stored in control device 15 and associated with underlying preforms A, C, F as well as their stored initial data ID1-ID3.

It is further schematically indicated that stretch blow molding machine 13 can be monitored, for example, with regard to the occurrence of a first machine error state FZ1, filling machine 14, for example, with regard to the occurrence of a second machine error FZ2. First machine error state FZ1 is, for example, a blow mold jamming or detecting a blow mold being loaded multiple times. Second machine error state FZ2 is, for example, a bottle fracture in the region of filling machine 14, a leak detected there or the like.

In the presence of a machine error state FZ1, FZ2, associated fourth or fifth results data ED4, ED5 are stored in control device 15 and associated with the respective preform concerned and its stored initial data ID1-ID3.

During the production operation, control device 15 carries out a data analysis at predetermined intervals on the basis of initial data ID1-ID3 collected for a plurality of preforms and respective results data ED1-ED5 available for this. The data analysis comprises, for example, data mining with classification and/or regression analysis and/or association analysis and can be based on self-learning algorithms in the sense of artificial intelligence. Based on the data analysis, lead-out criteria AK1-AK5 are calculated which determine which initial data ID1-ID3 or which results data ED1-ED5 cause preforms/bottles to be led out at one of lead-out devices 7-11.

A first lead-out criterion AK1 is used, for example, to decide whether a preform recognized as being faulty in first inspection unit 1 is to be separated from the product flow by first lead-out device 7. In the example shown, this is the case for preform B, as is shown schematically by a lead-out arrow. Preform B fulfills first lead-out criterion AK1, for example, if initial data ID1 measured for preform B deviates in an impermissible manner from a target value SW1 of associated preform parameter RP1 calculated in control device 15 on the basis of the data analysis.

After preform B has been led out at first lead-out device 7, triggered by first lead-out criterion AK1, no further initial data ID2, ID3 or results data ED1-ED5 can be collected for this preform B.

In order to optimize the production process as comprehensively as possible, however, it is desirable to possibly acquire additional initial data ID2, ID3 and/or results data ED1-ED5 for cosmetically faulty preforms in order to establish or to specify and/or weigh correlations between initial data ID2, ID3 and/or results data ED1-ED5. The data analysis, and therewith lead-out criteria AK1-AK5, can then be dynamically optimized on this basis.

On the other hand, damage to filling system 100, production interruptions, and product losses are to be prevented as comprehensively as possible. As a result, lead-out criteria AK1-AK5 are continuously optimized in order to meet the requirements for a meaningful data analysis as well as the requirements for an economical and smooth production process and the desired product quality.

Under this premise, as many preforms as possible are not led out at first lead-out device 7, but, as in the case of preforms A and C-G, are fed to heating station 12 and preheated there for subsequent stretch blow molding. Preforms A and C-G are thereafter inspected in second and third inspection units 2, 3 and their initial data ID2 and ID3 thus acquired is transmitted to control device 15.

It is verified for each of preforms A, C-G inspected in this manner whether a second lead-out criterion AK2 previously calculated in control device 15 on the basis of the data analysis is fulfilled.

It is fulfilled, for example, if at least second initial data ID2 or third initial data ID3 of a specific preform A, C-G deviates in an impermissible manner from a target value SW2, SW3 of respectively associated preform parameter RP2, RP3. In the example shown, this is the case for preform D. It is therefore separated from the product flow by second lead-out device 8.

Each lead-out criterion AK1-AK5 can be calculated almost at random on the basis of previously collected initial data ID1-ID3 and individually associated results data ED1-ED5. For example, if it has been found that a certain constellation of initial data ID1-ID3 correlates with results data ED1-ED5 that is negative for product quality and/or harmful to the production process.

First and/or second lead-out criterion AK1, AK2 would prevent a certain preform from being forwarded to heating station 12, stretch blow molding machine 13, and/or filling machine 15 in the event of such a negative prognosis in that the preform concerned is led out at first or second lead-out device 7, 8. Correspondingly, lead-out criteria AK1-AK5 can also be relaxed if this is concluded from an updated data analysis.

Initial data ID1-ID3 of preforms A and C-G do not fulfill second lead-out criterion AK2, so that they are fed to stretch blow molding machine 13. It is schematically indicated in the region of stretch blow molding machine 13 that a preform E that was not previously led out does not fulfill second lead-out criterion AK2 due to its initial data ID1-ID3, but does fulfill a third lead-out criterion AK3, for which reason preform E is separated from the product stream downstream of stretch blow molding machine 13 at third lead-out device 9. In this case, preform E is not treated and is only passed through stretch blow molding machine 13 or is treated only in part in stretch blow molding machine 13, for example, by stretching the [sic] without a subsequent blow molding process, and then separated out.

Downstream of stretch blow molding machine 13, preform E, or preform E treated only in part could either be led out without further inspection or previously be subjected to at least one further inspection in fourth and/or fifth inspection unit 4, 5. In this way, first and/or second results data ED1, ED2 usable within the framework of the data analysis could be acquired. Since preform E treated, or treated only in part cannot be filled with a product, it inevitably fulfills third lead-out criterion AK3 and is in any case separated from the product flow by third lead-out device 9.

All preforms whose initial data ID1 ID3 meet neither first nor second lead-out criteria AK1, AK2, presently preforms A, C, F and G, are blown to form bottles A', C', F' and G' in stretch blow molding machine 13 and inspected in fourth and fifth inspection unit 4, 5. First and second results data ED1, ED2 acquired in this manner is associated with underlying preforms A, C, F and G and can be correlated in the data analysis both with one another as well as with associated initial data ID1-ID3 of preforms A, C, F and G.

If a fourth lead-out criterion AK4 is fulfilled for the preforms examined in this manner, for example, for the reason that first results data ID1 and/or second results data ED2 deviate in an impermissible manner from a fourth or fifth target value SW4, SW5 of respectively associated bottle parameter FP1, FP2, then the respective bottles, in the example bottle G', are separated from the product flow at fourth lead-out device 10.

Correctly stretch-blow-molded containers A', C' and F' are fed to filling machine 14 and filled there with a product, in particular a beverage. Filled containers A', C', F' are examined, for example, in a fifth inspection unit 6. Third results data ED3 acquired in the process are likewise transmitted to control device 15.

A fifth lead-out device 11 arranged downstream of filling machine 15 is furthermore indicated schematically. It leads out faulty bottles for which a fifth lead-out criterion AK5 is fulfilled, for example, based on a comparison of third results data ED3 with a sixth target value SW6 of associated third bottle parameter FP3.

Continuously monitored machine error states FZ1, FZ2 are optionally likewise transmitted to control device 15 subject to an association with the relevant or underlying preform in order to take them into consideration in the data analysis in the sense of fourth and fifth results data ED4, ED5. All results data ED1-ED5 can thus be correlated with one another with single or groups of initial data ID1-ID3 individually for single preforms and/or for groups of preforms.

During ongoing production, initial data ID1-ID3 and results data ED1-ED5, to the extent available for the individual preforms and bottles, are associated with one another and accumulated. With the data analysis, for example, in the sense of data mining, correlations between individual preform parameters RP1-RP3, bottle parameters FP1-FP3, and/or machine error states FZ1, FZ2 can be calculated and continuously updated and, possibly, rendered more precise by acquiring initial data and results data during the production operation.

On this basis, individual lead-out criteria AK1-AK5 that subsequently apply in the production operation can be continuously recalculated in order to lead out individual preforms in a selective manner in such a way that production interruptions and/or damage can be prevented and as much information as possible about correlations between initial data and results data can be established at the same time.

Individual preform parameters RP1-RP3 or initial data ID1-ID3 associated therewith can be processed in a weighted manner depending on the effect on results data ED1-ED5. Such weighting of parameters and/or sets of parameters can also be continuously adapted during ongoing production operations in the sense of self-optimization of stretch blow molding and filling system 100 in order to produce as many high-quality bottles as possible from the preforms and/or to improve the informative value of the data analysis.

Random algorithms can be used in control device 15 for processing initial data ID1-ID3 and results data ED1-ED5. In particular those that enable machine-internal optimization and/or machine-internal learning in the sense of artificial intelligence.

Lead-out criteria AK1-AK5 can be dynamically adapted in dependence of the accumulating and/or updated data volume with mutually associated initial data of the preforms and results data of the containers blown therefrom.

Machine parameters MP, for example, of heating station 12, of stretch blow molding machine 13, and/or of filling machine 14 can be continuously adapted on the basis of acquired initial data ID1-ID3 and results data ED1-ED5 to optimize the product quality.

Initial data ID1-ID3 and results data ED1-ED5 acquired can flow into the production operation both through manually triggered and also through automated updating of lead-out criteria AK1-AK5 and/or machine parameters MP.

This simultaneously enables the minimization of machine error states and quality optimization when stretch blow molding and filling of bottles during ongoing operations.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for product guidance in a stretch blow molding system and/or filling system including a heating station, a stretch blow molding machine, and a filling machine, comprising:
    measuring preform parameters of preforms provided for stretch blow molding in the stretch blow molding machine in an automated manner and storing the measured preform parameters as initial data for stretch blow molding,
    measuring bottle parameters of bottles produced during the stretch blow molding and/or filled after the stretch blow molding with the filling machine, including determining, in an automated manner, machine error states of the heating station, the stretch blow molding machine, and/or the filling machine that occur during the stretch blow molding and/or filling process, and storing the measured bottle parameters and machine error states as results data of the stretch blow molding and/or filling, wherein results data for each bottle of the bottles is associated with initial data for a respective preform of the preforms used to generate that bottle,
    calculating at least one lead-out criterion applicable in a downstream production for deciding whether or not to lead out faulty preforms or bottles based on a data analysis of the stored initial data and results data, and where a calculation of said at least one lead-out criterion is updated while taking into consideration initial data and results data acquired during a downstream production operation,
    determining that said at least one lead-out criterion has been fulfilled,
    in response to fulfilling said at least one lead-out criterion: leading, via one or more first lead-out devices of the stretch blow molding system and/or filling system, said preforms out upstream of the stretch blow molding machine including blow molds provided for this purpose; passing said preforms through said blow molds without stretch blow molding and subsequently leading out the preforms via one or more second lead-out devices positioned downstream of the stretch blow molding machine; or stretch blow molding said preforms with the stretch blow molding machine to form bottles and leading out the bottles produced prior to filling via a third lead-out device, and
    in response to not fulfilling said at least one lead-out criterion for one or more further preforms, stretch blowing molding said one or more further preforms into one or more further bottles and filling said one or more further bottles with product.

2. The method according to claim 1, where said initial data and said results data acquired are incorporated into the downstream production operation updated in a manual and/or automated manner.

3. The method according to claim 1, where machine parameters of the stretch blow molding machine for producing said bottles, and/or the filling machine for filling said bottles are adapted to optimize a product quality obtained.

4. The method according to claim 3, where said machine error states comprise: a blow mold jamming; a blow mold being loaded multiple times; a preform jamming on a heating mandrel; emerging/existing leakage due to a poorly shaped container mouth; fouling of or damage to a heating station or a furnace due to thread formation and/or tumbling preforms; containers falling over due to bulging container bases; and/or a bottle leaking or bursting during the filling and/or pre-loading.

5. The method according to claim 3, wherein the machine parameters further comprise machine parameters of the heating station for preheating preforms.

6. The method according to claim 1, where said data analysis comprises data mining.

7. The method according to claim 6, wherein the data mining is an association analysis, and/or a regression analysis, and/or a data classification.

8. The method according to claim 1, where target ranges of preform parameters are defined based on said data analysis, and where said at least one lead-out criterion specifies which and/or to which extent initial data of a preform examined may deviate from respective target ranges.

9. The method according to claim 8, where said target ranges and/or said at least one lead-out criterion is/are updated based on a progressive accumulation of initial data and results data acquired.

10. The method according to claim 8, where several sets of parameters are taken into consideration in the data analysis, each of which comprises associated preform parameters and bottle parameters, and where deviations of measured preform parameters from their target ranges are included in a weighted manner in defining said at least one lead-out criterion.

11. The method in accordance with claim 10, wherein deviations of measured preform parameters from their target ranges are weighted dynamically on the basis of initial data and results data acquired.

12. The method according to claim 1, where said preform parameters indicate at least three of the following properties/states of said respective preform: its length and/or contour; its color; ovality of its sealing surface; fouling of its sealing surface; damage to its sealing surface; location of its injection point; a temperature profile in a wall of said respective preform; material stress in a wall of said respective preform; its material; air pockets, streaks and/or cracks; and a wall thickness.

13. The method according to claim 12, where said bottle parameters indicate at least two of the following properties and/or states of said bottles: a position of the injection point; fouling of the base; cloudiness of the base; contour of a side wall; fouling of the side wall; cloudiness of the side wall; ovality of the sealing surface; fouling of the sealing surface; damage to the sealing surface; distribution of material in the base; symmetry of a mass distribution; and bottle fracture.

14. The method according to claim 12, where said preform parameters indicate at least five of the said properties/states of said respective preform.

15. The method according to claim 1, where at least some of said preform parameters are detected by imaging upstream of and/or in an inlet region of the stretch blow molding machine.

16. The method in accordance with claim 15, wherein the preform parameters are detected by imagining upstream, in, and/or directly downstream of a heating tunnel for heating the preforms.

17. The method of claim 1, wherein determining that said at least one lead-out criterion has been fulfilled comprises determining that a first lead-out criterion has been fulfilled for a first preform, and further comprising in response to fulfilling the first lead-out criterion: leading, via the one or more first lead-out devices of the stretch blow molding system and/or filling system, the first preform out upstream of the stretch blow molding machine.

18. The method of claim 17, further comprising feeding a second preform to the heating station, determining that a second lead-out criterion has been fulfilled for the second preform, and in response, passing the second preform through said blow molds without stretch blow molding and subsequently leading out the second preform via the one or more second lead-out devices positioned downstream of the stretch blow molding machine.

19. The method of claim 18, further comprising feeding a third preform to the stretch blow molding machine, determining that a third lead-out criterion has been fulfilled for the third preform, and in response, stretch blow molding the third preform with the stretch blow molding machine to form a first bottle and leading out the first bottle prior to the filling machine via the third lead-out device.

20. A stretch blow molding and filling system with a stretch blow molding machine and/or a filling machine for bottles and further comprising: at least one lead-out device for preforms which is arranged upstream and/or downstream of said stretch blow molding machine; a lead-out device arranged downstream of said stretch blow molding machine for previously blown bottles; inspection units for said preforms and said bottles for collecting initial data and results data; and a control device for triggering said lead-out devices on the basis of at least one calculated lead-out criterion.

* * * * *